US012779413B2

(12) United States Patent
Ashe

(10) Patent No.: US 12,779,413 B2
(45) Date of Patent: Nov. 3, 2026

(54) METHOD AND APPARATUS PLUG FLOW SYSTEM

(71) Applicant: Robert Ashe, Buckinghamshire (GB)

(72) Inventor: Robert Ashe, Buckinghamshire (GB)

( * ) Notice: Subject to any disclaimer, the term of this patent is extended or adjusted under 35 U.S.C. 154(b) by 557 days.

(21) Appl. No.: 18/260,583

(22) PCT Filed: Jan. 5, 2022

(86) PCT No.: PCT/EP2022/050172

§ 371 (c)(1),
(2) Date: Jul. 6, 2023

(87) PCT Pub. No.: WO2022/148793

PCT Pub. Date: Jul. 14, 2022

(65) Prior Publication Data

US 2024/0009636 A1 Jan. 11, 2024

(30) Foreign Application Priority Data

Jan. 7, 2021 (GB) ..................................... 2100193

(51) Int. Cl.

| | |
|---|---|
| ***B01F 27/86*** | (2022.01) |
| ***B01F 27/053*** | (2022.01) |
| ***B01F 27/96*** | (2022.01) |
| ***B01F 35/00*** | (2022.01) |
| ***B01F 35/92*** | (2022.01) |
| *B01F 35/90* | (2022.01) |

(52) U.S. Cl.

CPC ............ *B01F 27/86* (2022.01); *B01F 27/053* (2022.01); *B01F 27/96* (2022.01); *B01F 35/55* (2022.01); *B01F 35/92* (2022.01); *B01F 2035/98* (2022.01); *B01F 2035/99* (2022.01)

(58) Field of Classification Search

CPC ................................ B01F 27/86; B01F 27/96

USPC ................................ 366/149, 302, 304, 306

See application file for complete search history.

(56) References Cited

U.S. PATENT DOCUMENTS 316,487 A * 4/1885 Ross .................. B01F 27/2711 366/304

390,349 A * 10/1888 Delpy ...................... A23G 9/12 366/279

(Continued)

FOREIGN PATENT DOCUMENTS

CN 110313312 A 10/2019

WO 2011124365 A1 10/2011

(Continued)

OTHER PUBLICATIONS

International Search Report for PCT/EP2022/050172 mailed Mar. 23, 2022, 4 pages.

(Continued)

*Primary Examiner* — David L Sorkin

(74) *Attorney, Agent, or Firm* — Nixon & Vanderhye, P.C.

(57) ABSTRACT

Method and apparatus for continuous processing to perform chemical or physical reactions comprises a tube in which internal axial stirrer blades mounted at the periphery of the tube are driven by a drive system. This generates tangential flow of material at the perimeter. Stationary axial baffles mounted inside the swept path of the stirrer blades convert tangential flow into turbulence and radial mixing.

18 Claims, 6 Drawing Sheets cutaway view of the assembled system

(56) References Cited

U.S. PATENT DOCUMENTS

| | | | | |
|---|---|---|---|---|
| 2,082,752 A * | 6/1937 | Lewis | A23G 9/12 | 62/343 |
| 3,898,042 A * | 8/1975 | Webb | G01N 33/1813 | 422/62 |
| 4,032,117 A * | 6/1977 | Burgess | B01F 27/114 | 366/307 |
| 4,494,878 A * | 1/1985 | Rainey, Jr. | B01F 27/86 | 138/40 |
| 5,399,014 A * | 3/1995 | Takata | B01J 19/0066 | 366/325.92 |
| 2020/0261867 A1 | 8/2020 | Ashe et al. | | |

FOREIGN PATENT DOCUMENTS

| | | |
|---|---|---|
| WO | 2014068011 A2 | 5/2014 |
| WO | 2017137580 A1 | 8/2017 |

OTHER PUBLICATIONS

Written Opinion of the ISA for PCT/EP2022/050172 mailed Mar. 23, 2022, 5 pages.

* cited by examiner

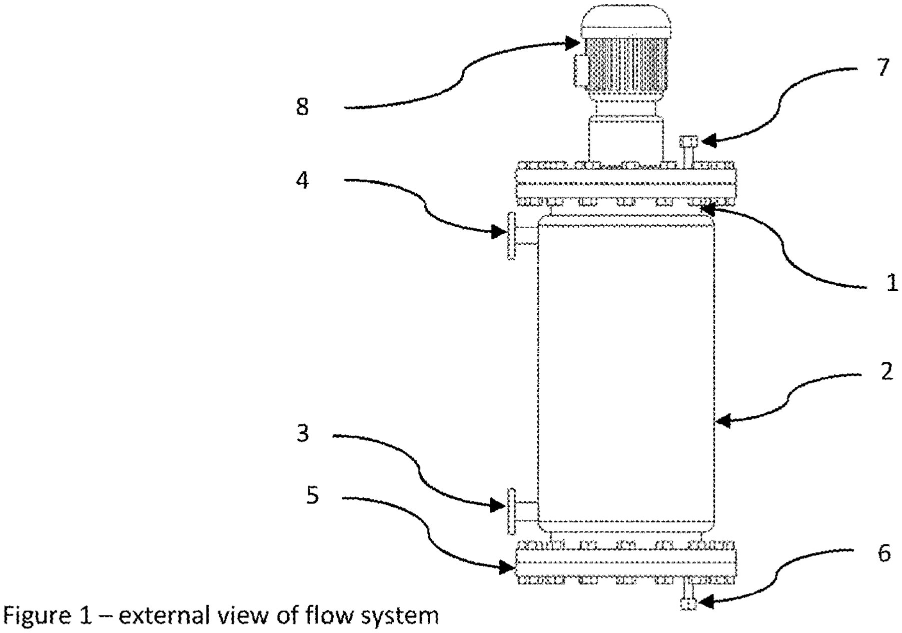
Figure 1 – external view of flow system
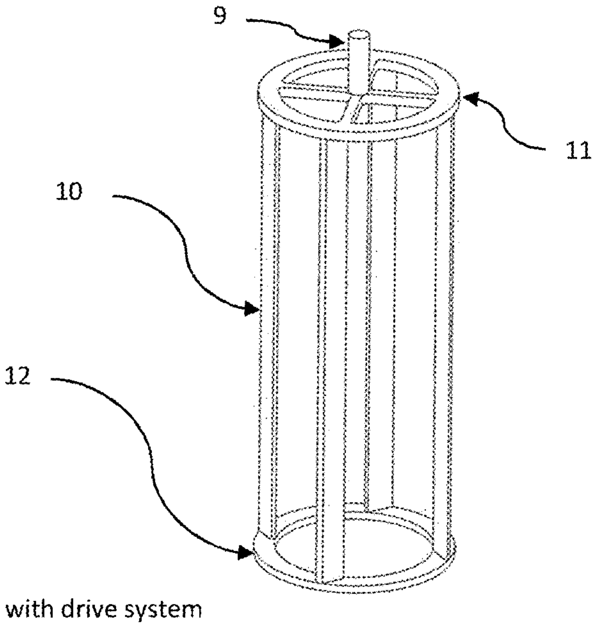
Figure 2 – mixer blades with drive system

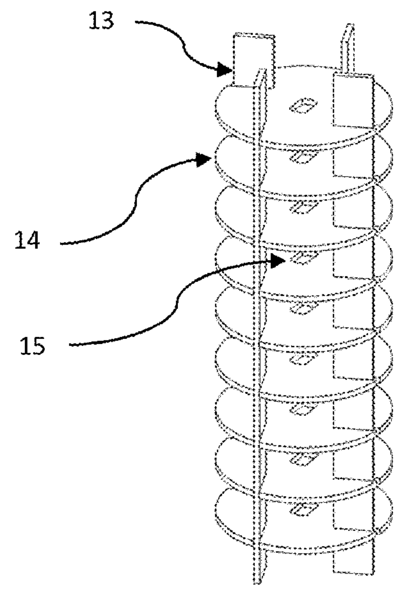
Figure 3 – baffle assembly
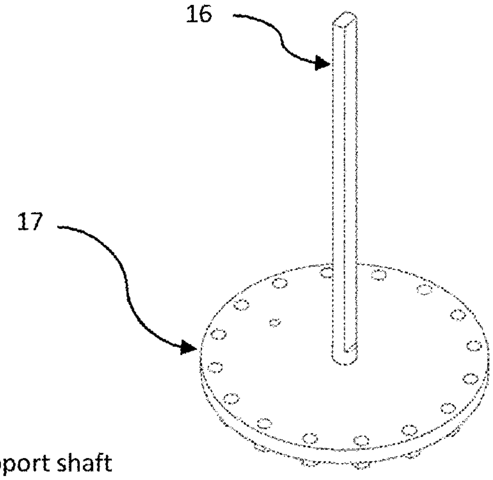
Figure 4 – baffle support shaft

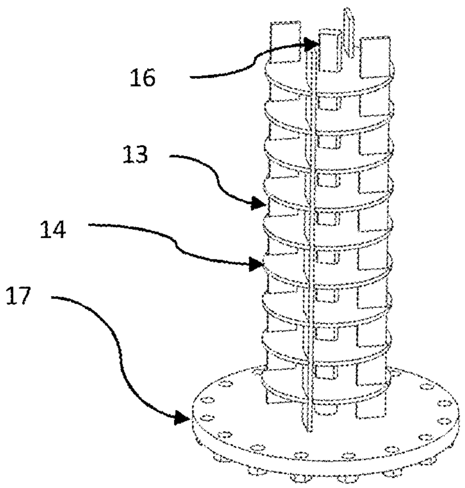
Figure 5 – radial baffles mounted on the axial baffles
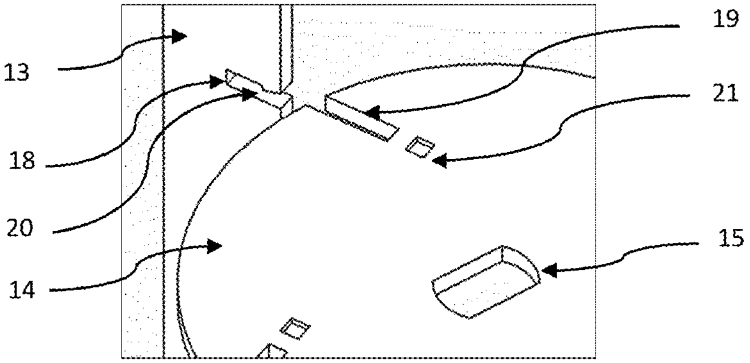
Figure 6 – baffle assembly locks

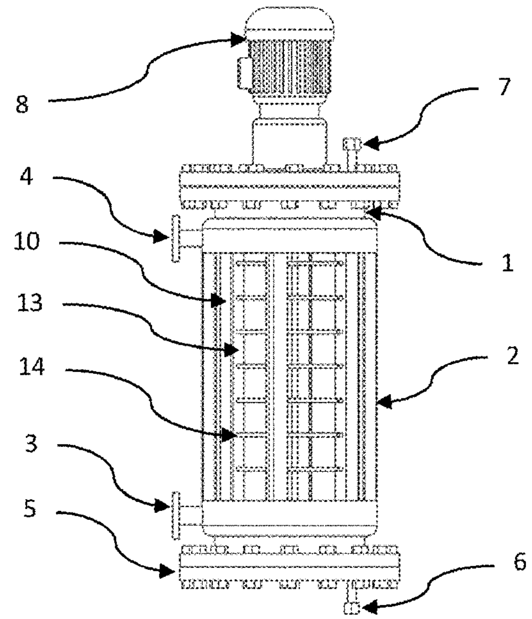
Figure 7 – cutaway view of the assembled system
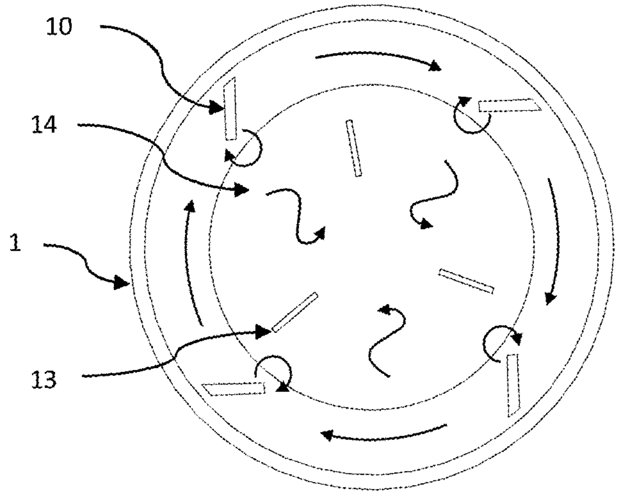
Figure 8 – plan view of mixing pattern

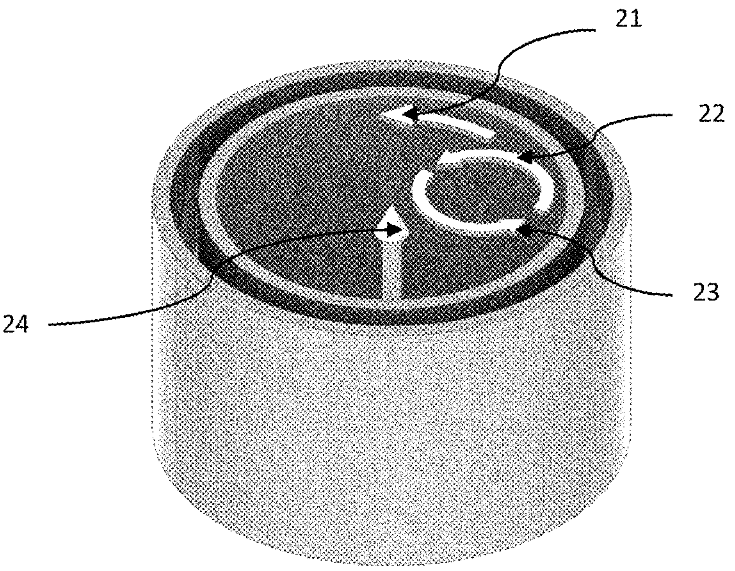
Figure 9 – required flow profile
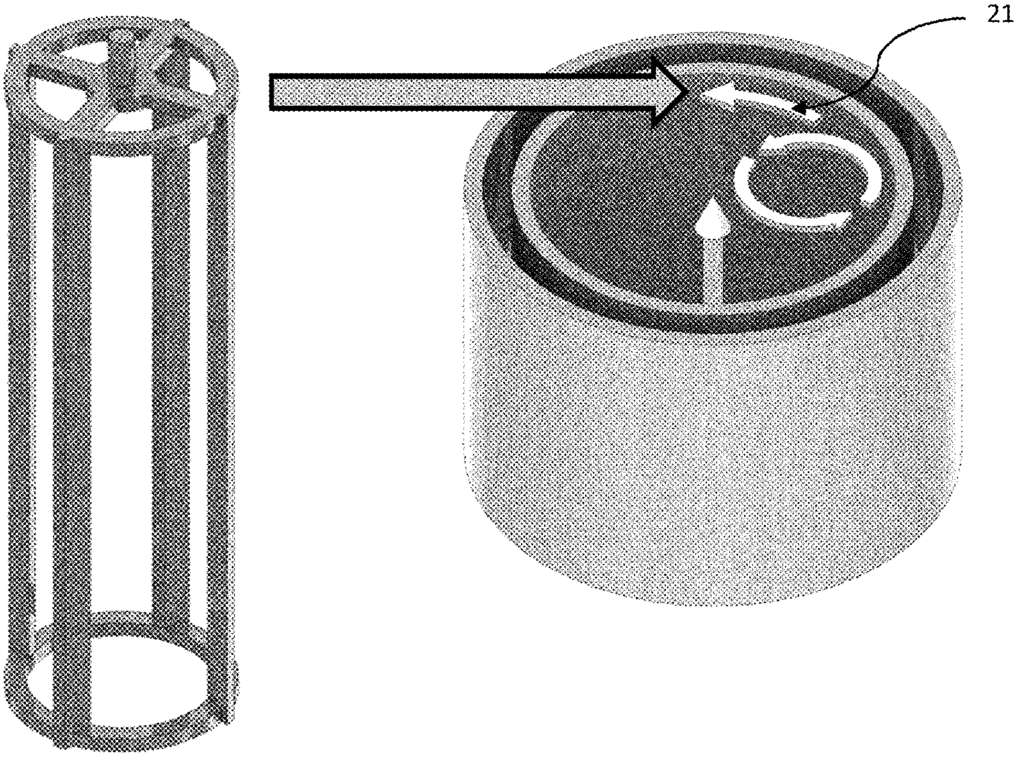
Figure 10 - Rotating blades generate tangential flow for good heat transfer

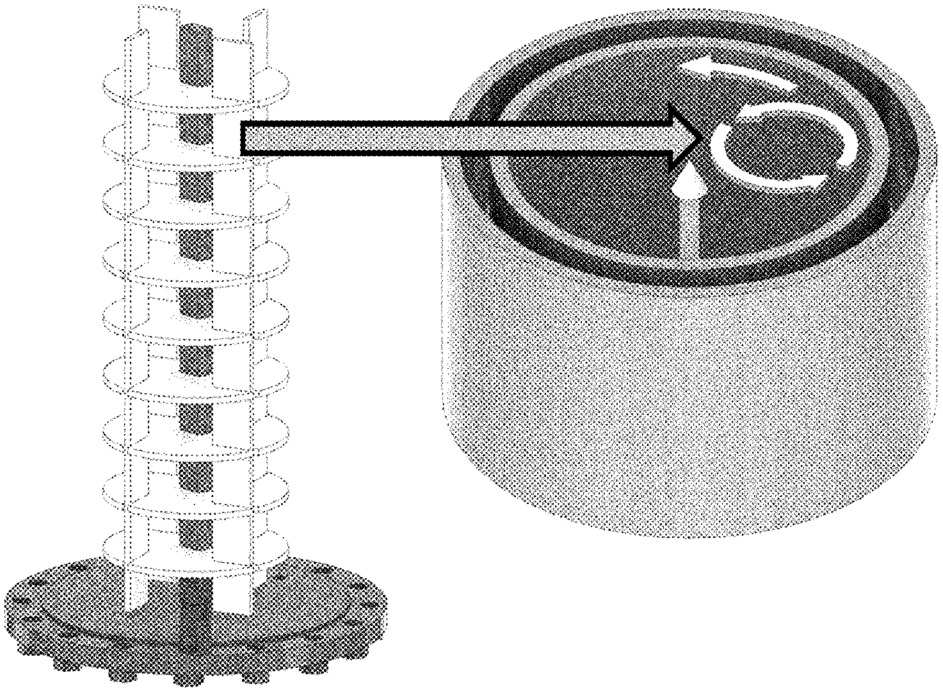
Figure 11 - Stationary axial baffles promote radial flow for uniform temp/composition
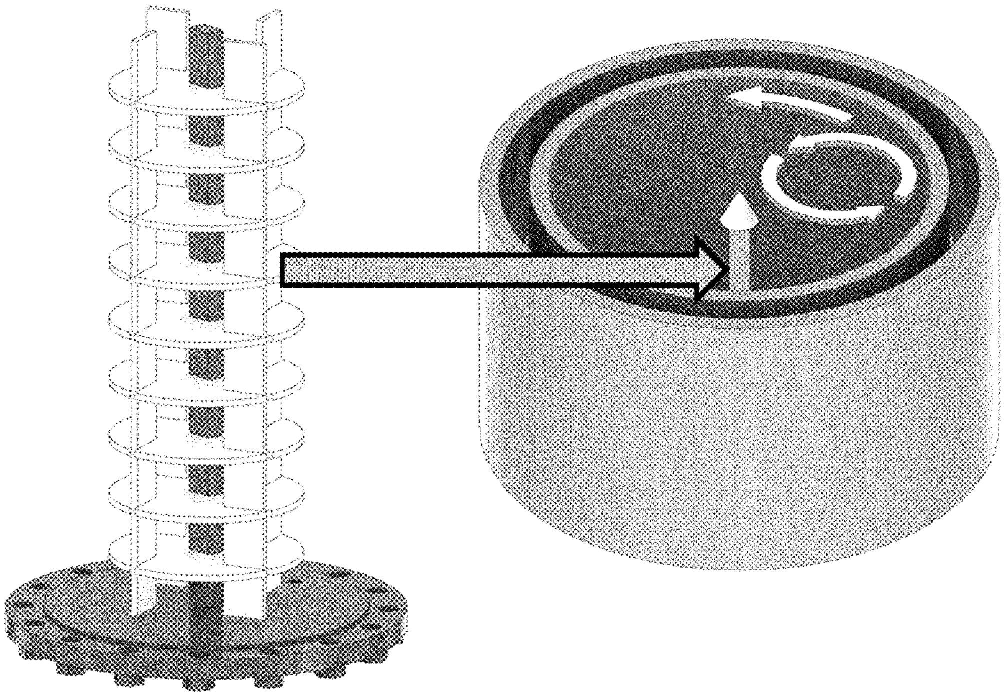
Figure 12 - Radial baffles reduce axial mixing for good plug flow

METHOD AND APPARATUS PLUG FLOW SYSTEM

CROSS-REFERENCE TO RELATED APPLICATIONS

This application is the U.S. national phase of International Application No. PCT/EP2022/050172 filed Jan. 5, 2022, which designated the U.S. and claims priority to GB 2100193.8 filed Jan. 7, 2021, the entire contents of each of which are hereby incorporated by reference.

The present invention is a flow system for continuous processing of fluid process materials under orderly or plug flow conditions. Stirred batch vessels process a single system volume at a time. Continuous flow systems process multiple volumes without interruption which makes them more productive and allows the system to be smaller and yet process a similar volume of fluid material in a given period. Reduced size facilitates higher ratios of heat transfer area to working volume of fluid, shorter mixing distances and improved shear characteristics. These factors contribute to lower capital and operating costs with higher performance and better outcomes such as improved yield and purity of product output. Other benefits include improved safety through a reduced inventory of in-process material, more uniform utilities demand and less space used. Continuous flow systems also offer better residence time control so process materials are not left degrading at elevated temperatures as can occur in stirred batch vessels.

There remains however a need to increase the throughput of continuous flow reactors in an economic way in order that flow reactors can be competitive with larger volume batch reactors.

For example it would be desirable to provide a flow reactor that was able to hold at least 50 litres of process material. For example a process needing a 15 minute residence time, a 50 litre flow system would process 2,000 litres in 10 hours. A 100 litre flow system would process 4,000 litres in 10 hours.

The present invention addresses these issues.

Processing according to this invention means physical or chemical changes made to process materials including but not limited to chemical reactions, enzymatic reactions, polymerisation, crystallisation, cell growth, precipitation, extraction and heating or cooling treatment.

The process material is a free-flowing fluid which may be a liquid and which may also contain gases, solid particles, or other liquids in different phases.

The body of the plug flow system of this invention is a tube and in this application the following terms have the following meanings. Radial refers to the plane across the diameter of the tube. Axial is the plane at 90 degrees to the radial plane and in line with the axis of the tube and the direction of fluid travel through the tube. Plug or orderly flow means fluids of similar density flow at substantially uniform axial velocity through the tube. Axial dispersion or back mixing is deviation from orderly flow. Materials of different densities such as gases, solids or immiscible fluids of different density may travel at different axial velocities to other materials or in the opposing axial direction. Radial mixing of the process material as it flows through the tube is mixing in the radial plane. Tangential flow is rotational flow of the process material in the radial plane. Residence time is the elapsed time between process material entering and leaving the system. Axial baffles are baffles extending along the axis of the tube and are used to promote radial mixing of the process fluid. Radial baffles can also be used to reduce axial dispersion of the process fluid. The plug flow length of the tube refers to the stirred plug flow region of the tube.

The invention is primarily concerned with activities within the plug flow length of the tube. However the tube may also contain non-plug flow lengths.

The plug flow length may be separated from any non-plug flow lengths by radial baffles. Non-plug flow lengths may be unstirred or randomly mixed using pitched blade or Rushton turbine blade stirrers. Non-plug flow lengths may be used for other purposes such as premixing or phase separation.

The invention aims to provide flow conditions for the process material within the plug flow length comprising radial mixing to maintain uniform temperature and composition of the process material in the radial plane, shear at the tube's heat transfer surface to promote heat transfer, and low axial dispersion for good residence time control. Shear and turbulence within the bulk fluid promote improved contact between materials. In the case of biphasic mixtures shear also promotes increased interfacial area between different phases and reduced boundary layer resistance.

Flow systems which employ passive mixing rely on axial travel of fluid to generate radial mixing. The current invention uses active mixing with axial sweeping stirrer blades over at least most of the plug flow length and axial baffles to promote radial mixing and shear. In a preferred embodiment, radial baffles are provided in the tube to reduce axial dispersion. Subject to the right design, this offers higher working capacity per unit length than passively mixed flow systems. Mixing and orderly flow are also substantially decoupled from residence time. This makes them more scalable, more versatile in terms of residence time providing opportunities for increased throughput additionally they are better able to handle multiphase mixtures.

Extensive prior art exists concerning actively mixed plug flow systems as stirred tubes. WO 2004/026942A1 shows a stirred tube with radial baffles extending across the entire width of the tube. Rotating stirrer blades are provided in the sections defined by the radial baffles and are mounted on a central shaft which extends to the full length of the tube. The combination of a central stirrer shaft and radial baffles makes this solution difficult to build and assemble since the radial baffles need to be stationary and the stirrer shaft cannot be removed without withdrawing the baffles. No axial baffles are used which reduces the effectiveness of radial mixing and shear since the bulk process material rotates only tangentially giving unsatisfactory radial mixing. Furthermore, high mixing speeds promote greater centrifugal separation when materials of different density are present.

WO 2017/137580 relates to a rotating tube mixer which can be rotated in reciprocating arcs about its longitudinal axis and provided with removeable mixing elements within the reactor. The reactor contains fixed internal mixer blades which rotate with the rotation of the tube and also a moving mixer blade able to rotate independently of the tube. The mixer of WO 2017/137580 however uses the axial stirrer blades to act as both stirrer blades and baffles. These generate tangential flow but only on the drive stroke. At the end of the drive stroke the blades stop and this generates a baffling effect to promote radial flow and mixing.

The present invention provides an apparatus for continuous axial flow of process material comprising a tube with a plug flow length provided with stationary axial baffles mounted to provide a continuous gap between the baffles and the interior surface of the tube and further provided with axial blades which can be driven to sweep the gap. The axial blades rotate continuously during mixing and the rotation is only in one direction.

The invention further provides a process for continuous processing of fluids comprising delivering a process material to a tube for axial flow along the tube wherein the fluid is subject to tangential flow generated by rotating axial stirrer blades and radial mixing by axial baffles which divert fluid towards the centre of the tube both actions occurring while orderly flow of the process material along the tube is maintained.

The process preferably also uses stationary radial baffles to prevent or reduce axial dispersion and thereby retain orderly flow of the process material.

In the preferred process a circumferential gap is provided between the baffles and the wall of the tube and tangential flow in the fluid is created by axial stirrer blades positioned within the gap and which sweep the gap with process material therein.

The present invention therefore provides an actively mixed plug flow system with axial baffles providing a unique flow pattern for the process fluid. In a preferred embodiment radial baffles are also used. The tube of the system is preferably sealed with end covers. Feed materials are added at one end of the tube continuously and processed material is discharged at the other end of the tube continuously. Intermediate addition and take off points along the tube may also be used. It is preferred that the baffles and stirrer shaft can be removed from the tube independently. Furthermore the fixed baffles are mounted independently of the axial stirrer blades and not supported by these blades. The design facilitates the use of baffles fabricated in metal or materials which may have low mechanical strength but good chemical resistance such as synthetic polymers. In a preferred embodiment it also permits assembly of radial and axial baffle elements without bonding or welding.

The invention is illustrated but in no way limited by reference to the accompanying Figures in which FIG. 1 is an external view of an apparatus according to the invention.

FIG. 2 shows the axial stirrer used in the apparatus of FIG. 1.

FIG. 3 shows the axial and radial baffles of the apparatus of FIG. 1.

FIG. 4 shows the baffle support shaft of the apparatus of FIG. 1.

FIG. 5 shows the radial and axial baffles mounted on the support shaft of FIG. 4.

FIG. 6 illustrates the preferred method of assembling the baffles.

FIG. 7 is a cut away view of the assembled apparatus of FIG. 1.

FIG. 8 shows the mixing pattern of a process material in the radial plane as it flows through the plug flow length of the tube.

FIG. 9 is a schematic illustration of the flow pattern of the process fluid as it moves in an orderly fashion along the tube.

FIG. 10 illustrates how the rotating axial stirrer blades create the tangential flow pattern illustrated in FIG. 9.

FIG. 11 illustrates how the stationary axial baffles create the radial flow pattern illustrated in FIG. 12 shows how the radial baffles reduce axial mixing and maintain orderly flow.

FIG. 1 is an external view of the plug flow length of a tube of this invention. The system body 1 is a rigid tube with rigid cover plates at each end to form a sealed system. The preferred tube length is not greater than 10 times the internal diameter and more preferably not greater than 6 times. It is preferred that the tube length is not less than the internal diameter and more preferably not less than 1.5 times the internal diameter. The tube can be mounted at any angle but vertical is preferred and it may be surrounded by one or more jackets 2 through which heat transfer fluid can be passed for heating or cooling but other means of heating or cooling the tube wall may be used. Connections 3 and 4 are provided on the jacket for the passage of heat transfer fluid. Cover plates are fixed at each end of the tube to seal the system. Process connections 6 and 7 allow process material to feed and discharge from the tube at opposite ends, respectively. Multiple inlet and outlet connections may be used as required. These may be connected at the tube walls or through channels which pass up through the baffle assembly. Instruments may be inserted in a similar way. The direction of flow, choice of counter current flow and location of feed and take off points will depend on the processing to be performed in the apparatus. The drive system 8 rotates the stirrer shaft (9 of FIG. 2) and is mounted on the drive cover plate 5. Different types of drive system may be used such as electrical, hydraulic, or pneumatic. Gear boxes are used according to need. The drive shaft for the rotating stirrer is preferably sealed by conventional means such as mechanical seal, stuffing box, gland, or magnetic coupling.

FIG. 2 shows the axial stirrer. This comprises of a drive shaft 9 which is connected to the drive system 8. The stirrer blades 10 are mounted on arms or a hub 11 fixed to the drive shaft. A support ring 12 may be used as required. The stirrer blades preferably extend the full plug flow length less the clearance needed to rotate freely. It is preferred that the axial blades are straight in the axial plane to minimise axial dispersion of the process material. The blades are mounted at the perimeter of the tube close to the internal wall of the tube. The number of blades may be varied according to need. The blade angles may be in line with the centre line across the tube or pitched at an angle. It is preferred that the swept path of the blades is 30% of the tube diameter or less.

FIG. 3 shows the baffle assembly. Axial baffles 13 increase turbulence and radial mixing by diverting the tangential flow of the process material to the centre of the tube. It is preferred that the axial baffles are straight in the axial plane to minimise axial dispersion. Radial baffles 14 reduce axial dispersion. The axial and radial baffles are preferably stationary. The number of axial baffles may be varied according to need. They are preferably parallel to the stirrer blades in the axial plane and are preferably of the same length less clearance needed to allow free movement of the stirrer. The axial baffles lie inside the swept path of the stirrer blades 10 of FIG. 2 and may be in line with the centre line across the tube or pitched at an angle. It is preferred that they do not extend to the centre to allow free movement of fluid across the diameter of the tube. Radial baffles 14 lie inside the swept path of the stirrer blades. These are preferred but the system can operate without them. When used the radial baffles 14 may be a solid plate or have perforations or openings. Their role may also be limited to serving as anchor points to prevent lateral movement of the axial baffles 13. Five or more radial baffles spaced along the plug flow length of the tube are preferred and eight or more are more preferred. The hole 15 in the radial baffles is provided to enable mounting the baffles as a slide fit on the baffle support shaft (16 of FIG. 4). This may be offset from the centre, but a central hole is preferred. Alternatively the baffles can be assembled and fixed in place by welding, bonding, screws, or bolts but the assembly method described below is preferred.

FIG. 4 shows the baffle support shaft 16. Alternative mounting arrangements can be used for holding the baffles in place, but the support shaft described here is the preferred method. The baffle support shaft 16 is fixed to the baffle cover plate 17 which is fixed to the tube at the opposite end to the drive cover plate. Although the profile of the shaft 16 can be round, non round is preferred and it is preferred that it is of a shape which matches the profile of the holes 15 of the radial baffles 14 shown in FIG. 4. This shaft 16 holds the baffles in the axial and radial plane and the non-circular profile matching the hole profile of the axial baffles prevents them from rotating. The baffles can rest on the baffle support shaft 16 or the axial baffles can rest on the baffle end cover 17.

FIG. 5 shows the baffles mounted on the baffle support shaft 16. It is preferred that the axial and radial baffles are coupled together as an assembly to form a slide fit on the baffle support shaft 16. A locking cap can be fitted to the end of the baffle support shaft if required to prevent the baffle assembly from lifting. The outer edge of the axial baffles may lie parallel to the outer edge of the radial baffles, outside it or inside it.

FIG. 6 shows the preferred method for assembling the axial and radial baffles. The axial baffle 13 has a slot 18 and the radial baffle 14 has a slot 19. The radial baffle and axial baffle slots overlap and push together to form a rigid 3-dimensional structure. The radial and axial baffles can be locked in place by different methods such as interference fits, keys, or lips. One example is shown in FIG. 6 with tab 20 locking into slot 21. This method of assembly which does not require bonding, welding, or fixing devices is preferred. It has a lower fabrication cost and enables the components to be made from materials which are difficult to weld or bond such as PTFE or sheet metal. The PTFE may also be glass filled for additional rigidity.

FIG. 7 shows the assembled system with a cut away view of the internals the reference numerals indicating the same components as in the other Figures. In operation the stirrer blades 10 sweep the gap formed outside of the baffles to generate tangential flow in the process materials; they are supported by the drive end cover. The axial baffles divert the tangential flow of the process fluid to generate radial mixing, shear and turbulence in the radial plane. The radial baffles reduce axial dispersion. The axial and radial baffles are formed as a single assembly and supported by the baffle end plate. Slots in the axial baffles hold the radial baffles in the desired radial position. Slots in the radial baffles hold the axial baffles in the desired axial position. The baffle support shaft holds the baffle assembly in the required axial position and prevents twisting.

The arrows within the tube 1 of FIG. 8 show the mixing pattern of a process fluid in the radial plane as it flows through the plug flow length of the tube. The pattern comprises tangential flow at the perimeter of the gap with radial movement as fluids pass round the mixing blades 10. Internally axial baffles 13 convert tangential flow into radial mixing within the spaces defined by the radial baffles 14.

The flow pattern of the process material generated as the material passes through the apparatus of this invention is illustrated in a schematic fashion in FIGS. 9 to 12.

FIG. 9 shows the flow profile including tangential flow illustrated by arrow 21 combined with radial flow illustrated by the arrows 22 and 23, arrow 24 indicates the axial direction of flow of the material.

FIG. 10 shows how the tangential flow 21 is generated by the mixer blades illustrated in FIG. 2.

FIG. 11 shows how the stationary axial baffles of FIG. 4 create radial flow and FIG. 12 shows how the radial baffles shown in FIG. 5 reduce axial mixing and create orderly flow the material.

Materials of construction for the various components are selected according to the needs of mechanical strength, operating temperature, and chemical resistance. This can include but not limited to metals, metal alloys, glass, ceramic, plastic, composites, and lined metal.

Process materials are fed into to the tube at a controlled rate typically using pumps which can be in the feed or discharge lines. Other possible means of fluid transfer include gravity transfer, pressure padding the head space in the feed tank with a gas or applying vacuum to the head space of the discharge tank. Gas may be added by a compressor or from a pressurised container. Flow of process material may be controlled by a pump or a flow control valve.

The required operating temperature at a given point is set or controlled by regulating the flow or temperature of the heat transfer fluid passing into the heating/cooling jacket (2 in FIG. 1). Temperature measuring instruments may be used in the jacket fluid and the process fluid. A flow measuring element may be used to measure the flow of the heat transfer fluid.

Intermediate addition or take off points, and instruments can be inserted into any position within the system using pipes or probes which may be fixed to the baffle end plate. These can either pass up through the baffle support shaft or through holes cut in the radial baffles.

The volumetric capacity of the plug flow length may vary from 100 millilitres to 10 $m^3$ according to need. The preferred capacity is from 1 litre to 200 litres. The stirrer blades can operate at different speeds with different blade shapes, numbers, and angles. The same variability applies to the baffles. The design and operating parameters will be chosen according to the scale of the operation and the nature of the processing to be performed within the apparatus.

The invention claimed is:

1. A continuous flow reactor for mixing a continuous axial flow of fluid process material, the continuous flow reactor comprising a tube with a plug flow length provided with stationary axial baffles mounted to provide a continuous gap between the baffles and the interior surface of the tube and further provided with axial stirrer blades within the plug flow length which can be driven to sweep the gap to generate tangential flow in the tube during orderly flow of the fluid process material along the tube; wherein the stationary axial baffles are arranged to divert the process material towards the centre of the tube to provide radial mixing of the fluid process material during orderly flow of the fluid process material along the tube;

wherein the continuous flow reactor is provided with stationary radial baffles within the plug flow length which do not extend into the gap; and wherein the radial baffles are spaced axially along the plug flow length of the tube.

2. A continuous flow reactor according to claim 1 wherein the fluid process material flows through the tube continuously with orderly flow and the tube is provided with connections for feed and discharge of materials.

3. A continuous flow reactor according to claim 1, in which the axial blades rotate continuously during mixing and the rotation is only in one direction.

4. A continuous flow reactor according to claim 1, wherein the tube is provided with covers at its ends and the stirrer blades are held in position by a shaft which passes through one end cover and the axial baffles are held in position by the opposing end cover.

5. A continuous flow reactor according to claim 1, wherein the axial and radial baffles are joined together by interlocking slots to form a rigid assembly without welding, bonding, screws or fixing bolts.

6. A continuous flow reactor according to claim 5 wherein the axial and radial baffles are mounted on a baffle support shaft as a slide fit.

7. A continuous flow reactor according to claim 1, in which the baffles are formed of synthetic polymeric material.

8. A continuous flow reactor according to claim 7 in which the synthetic polymeric material is polytetrafluorethylene.

9. A continuous flow reactor according to claim 1 provided with one or more external jackets for heating or cooling the fluid process material.

10. A continuous flow reactor according to claim 1, wherein the radial baffles are arranged to reduce axial dispersion of the fluid process material.

11. A continuous flow reactor for mixing a continuous axial flow of fluid process material, the continuous flow reactor comprising a tube with a plug flow length provided with stationary axial baffles mounted to provide a continuous gap between the baffles and the interior surface of the tube and further provided with axial stirrer blades within the plug flow length which can be driven to sweep the gap to generate tangential flow in the tube during orderly flow of the fluid process material along the tube; wherein the stationary axial baffles are arranged to divert the process material towards the centre of the tube to provide radial mixing of the fluid process material during orderly flow of the fluid process material along the tube;

wherein the continuous flow reactor is provided with stationary radial baffles within the plug flow length which do not extend into the gap; and wherein the radial baffles are arranged to reduce axial dispersion of the fluid process material.

12. A continuous flow reactor according to claim 11, wherein the fluid process material flows through the tube continuously with orderly flow and the tube is provided with connections for feed and discharge of materials.

13. A continuous flow reactor according to claim 11, in which the axial blades rotate continuously during mixing and the rotation is only in one direction.

14. A continuous flow reactor according to claim 11, wherein the tube is provided with covers at its ends and the stirrer blades are held in position by a shaft which passes through one end cover and the axial baffles are held in position by the opposing end cover.

15. A continuous flow reactor according to claim 11, wherein the axial and radial baffles are joined together by interlocking slots to form a rigid assembly without welding, bonding, screws or fixing bolts.

16. A continuous flow reactor according to claim 15, wherein the axial and radial baffles are mounted on a baffle support shaft as a slide fit.

17. A continuous flow reactor according to claim 11, in which the baffles are formed of synthetic polymeric material.

18. A continuous flow reactor according to claim 17, in which the synthetic polymeric material is polytetrafluorethylene.

* * * * *